United States Patent
Rudland

(10) Patent No.: US 8,385,323 B2
(45) Date of Patent: Feb. 26, 2013

(54) ROUTE DETERMINING METHODS FOR A NETWORK

(75) Inventor: Philip Philip Andrew Rudland, Horley (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 1257 days.

(21) Appl. No.: 12/160,904

(22) PCT Filed: Jan. 9, 2007

(86) PCT No.: PCT/IB2007/050059
§ 371 (c)(1),
(2), (4) Date: Jul. 15, 2008

(87) PCT Pub. No.: WO2007/083249
PCT Pub. Date: Jul. 26, 2007

(65) Prior Publication Data
US 2010/0177679 A1    Jul. 15, 2010

(30) Foreign Application Priority Data
Jan. 18, 2006 (EP) .................................. 06100531

(51) Int. Cl.
*H04L 12/28* (2006.01)
(52) U.S. Cl. ................................... 370/351; 370/395.31
(58) Field of Classification Search .................... None
See application file for complete search history.

(56) References Cited

U.S. PATENT DOCUMENTS
2003/0202468 A1* 10/2003 Cain et al. ..................... 370/229
2005/0180447 A1   8/2005 Lim et al.
2005/0221752 A1   10/2005 Jamieson et al.

FOREIGN PATENT DOCUMENTS
WO    WO0041365 A1    7/2000
WO    WO2004109974 A1    12/2004

OTHER PUBLICATIONS

Johnson et al: "Dynamic Source Routing in Ad-Hoc Wireless Networks" Computer Science Department, Carnegie Mellon University, [Online] 1996, Retrieved From the Internet on May 4, 2007, HTTP://WWW.CS.YALE.EDU/HOMES/LANS/READINGS/ROUTING/JOHNSON-DSR-1996.PDF.
Ergen S. C.: ZigBee/IEEE 802.15.4 Summary [Online]. Sep. 10, 2004. Retrieved From the Internet on May 4, 2007, HTTP://WWW.EECS.BERKELEY.EDU/{CSINEM/ACADEMIC/PUBLICATIONS/ZIGBEE/PDF.

* cited by examiner

*Primary Examiner* — Faruk Hamza
*Assistant Examiner* — Tito Pham
(74) *Attorney, Agent, or Firm* — Larry Liberchuk

(57) ABSTRACT

An invitation message (112, 116, 120) is sent from a concentrator (102) to nodes in a network. Each node records (124) an identifier (126) of the node or concentrator from which it received the message and forwards (122) the message to its neighbors. A node (108) then sends a trace message (132, 134, 136) to the concentrator (102) via intermediate nodes (106, 104) traversed by the invitation message in reaching the node and appends thereto the identifiers of the intermediate nodes. The concentrator then uses source routing to send a subsequent message (144, 146, 148) to the node (108) using the identifiers included in the trace message. The invitation message and/or the subsequent message includes characteristics) (200) of the concentrator one or more of which are then stored by nodes, including node (108). The characteristic(s) are used in deciding (206, 208) to send further trace messages, thereby regulating use of network bandwidth.

12 Claims, 4 Drawing Sheets

ROUTE DETERMINING METHODS FOR A NETWORK

The present invention relates to determining routing information in a network, in particular to methods and systems for determining such information in a multi-hop wireless network.

The topology of a multi-hop wireless network can vary in that the presence of particular nodes may be sporadic (for example due to mobility, or not presently communicating in order to conserve battery power, etc.). It is therefore problematic to establish and maintain data routes between nodes of such a network.

A known technique to mitigate this is to establish a route from a source node to a destination node for subsequent messages. The source node issues an invitation message to other nodes in the network. As the invitation message traverses the network, each node receiving the message stores the identity of the node which supplied the message and then forwards the message to its neighboring nodes. Subsequently, a destination node responding to the invitation message sends a trace route message to the source node via the intermediate nodes traversed by the invitation message, the trace route message acquiring the identity of each such intermediate node as it travels to the source node. By this means the source node obtains an explicit "source route" to the destination node from the received trace route message. Subsequently, a message sent by the source node to the destination node also contains route information which is used by intermediate nodes to route the message to the destination node. Clearly, the source node requires storage to store source route information for the destination nodes with which the source node needs to subsequently communicate.

A technique similar to that outlined above is proposed for ZigBee networks incorporating concentrators. Concentrators are data aggregators which for example service and manage a population of ZigBee nodes. A key issue in ZigBee systems is low cost—each node in the network should be low cost, including concentrators. ZigBee networks are multi-hop wireless networks and therefore could inherently benefit from the technique described above. However, for large networks the technique either requires use of a costly concentrator having large storage capacity to store source routes for many nodes or an inefficient network bandwidth utilization due to the need to re-establish route information from the concentrator to a destination node. Furthermore, a network comprising several concentrators having different characteristics makes it difficult to achieve an optimal solution.

It is an object to improve on the known art.

According to a first aspect of the present invention there is provided a method for determining routing information for a network of nodes comprising:

sending a first message from a concentrator to nodes in the network, wherein each node records an identifier of the node or concentrator from which it receives the first message and then forwards the first message to its neighboring nodes;

sending a second message identifying a first node to the concentrator, which second message traverses any intermediate nodes traversed by the first message to reach the first node and has appended thereto the identifier of each such intermediate node; and determining a route for a third message from the concentrator to the first node according to the identifiers included in the second message; characterized in that, the first message further comprises at least one characteristic of the concentrator, the method further comprising:

recording at least one characteristic at the first node; and, sending a further second message at least partially in dependence on the at least one characteristic.

Advantageously a node of the network having received the first message is then aware of characteristic(s) of the concentrator and can take this into account in deciding whether to send a further second message to trace the route back to the concentrator. Clearly, a node able to send messages to more than one concentrator can adapt the sending of further second messages according to the particular concentrator with which it intends communicating. An inherent capability of the invention is the ability to operate effectively in a network comprising concentrators of differing characteristics.

A further advantage is that the concentrator can optionally inform a particular node of its characteristic(s) by including such in a third message intended for the node. In one example, advising the node that the concentrator is running low on memory and therefore the node should send second messages on subsequent occasions since the concentrator can no longer guarantee to cache (store) the source route data for that node. In another example, irrespective of the general characteristics advised to nodes by a concentrator using the first message, the concentrator advises a specific node not to send further second messages since the data traffic level between that node and the concentrator is high, thereby conserving network bandwidth. In this case, the concentrator would ensure caching (storing) the source route data for that node.

According to a second aspect of the invention there is provided a method for determining routing information for a network of nodes comprising:

sending a first message from a concentrator to nodes in the network, wherein each node records an identifier of the node or concentrator from which it receives the first message and then forwards the first message to its neighboring nodes;

sending a second message identifying a first node to the concentrator, which second message traverses any intermediate nodes traversed by the first message to reach the first node and has appended thereto the identifier of each such intermediate node; and determining a route for a third message from the concentrator to the first node according to the identifiers included in the second message;

characterized in that, the third message further comprises at least one characteristic of the concentrator, the method further comprising:

recording at least one characteristic at the first node; and, sending a further second message at least partially in dependence on the at least one characteristic.

Advantageously, the first node having received the third message is then also made aware of characteristic(s) of the concentrator and can take this into account in deciding whether to send a further second message to trace the route back to the concentrator. Other nodes of the network, having received the first message, are aware of the presence of the concentrator but, in the absence of being provided explicit characteristic(s), assume one or more default characteristics for the concentrator to take into account in deciding whether to send a further second message to trace the route back to the concentrator. As an example, a default concentrator characteristic is where capacity to store source route data is constrained, implying that nodes of the network are required to send further second messages. In this example case, advantageously a node which frequently communicates with the concentrator can be provided characteristic information by the concentrator using the third message which advises the node that the source route data for that node will be stored by the concentrator, thereby reducing network bandwidth use by not requiring further second messages to be sent by that node.

In a preferred embodiment, a characteristic of the concentrator sent to nodes is an indicator denoting the amount of storage capacity available for storing identifiers of nodes which constitute source routes to one or more nodes. Further or alternative characteristics of a concentrator can be identified which may be of use to a node. Furthermore, as inferred above, such characteristics of concentrators can be communicated to an individual node or plurality of nodes in a dynamic fashion to thereby adjust the actions of nodes (e.g. sending of further second messages) according to the instantaneous real time requirements of applications and/or traffic loading in the network.

The methods described are suitable for any multi-hop wired or wireless network, for example paths between routers in wide area networks including the Internet, or paths within wireless IrDA, Wi-Fi or Bluetooth networks, etc. The methods can scale to any number of nodes and concentrators while maintaining the advantages stated. In a preferred embodiment, the first message is a modified ZigBee route request frame and the second message is a ZigBee route record command frame or a modified ZigBee network layer data frame. Optionally, the third message is a modified ZigBee network layer data frame.

According to further aspects of the present invention there are provided systems for determining routing information for a network of nodes according to the methods described above, as specified in the appended claims to which the reader is referred. In summary the invention provides a useful solution for a multi-hop wired or wireless network that is scalable to larger networks whilst ensuring efficient usage of network data bandwidth and cost effective use of a mix of concentrators likely to exist in practical implemented systems. It has the further ability to dynamically adapt to changing circumstances, for example those relating to real-time network traffic.

Embodiments of the invention will now be described, by way of example, with reference to the accompanying drawings, in which.

In the present description, the following term is defined. The term 'concentrator' means a data aggregator which for example services and manages a population of network (e.g. ZigBee) nodes.

Figure 1:
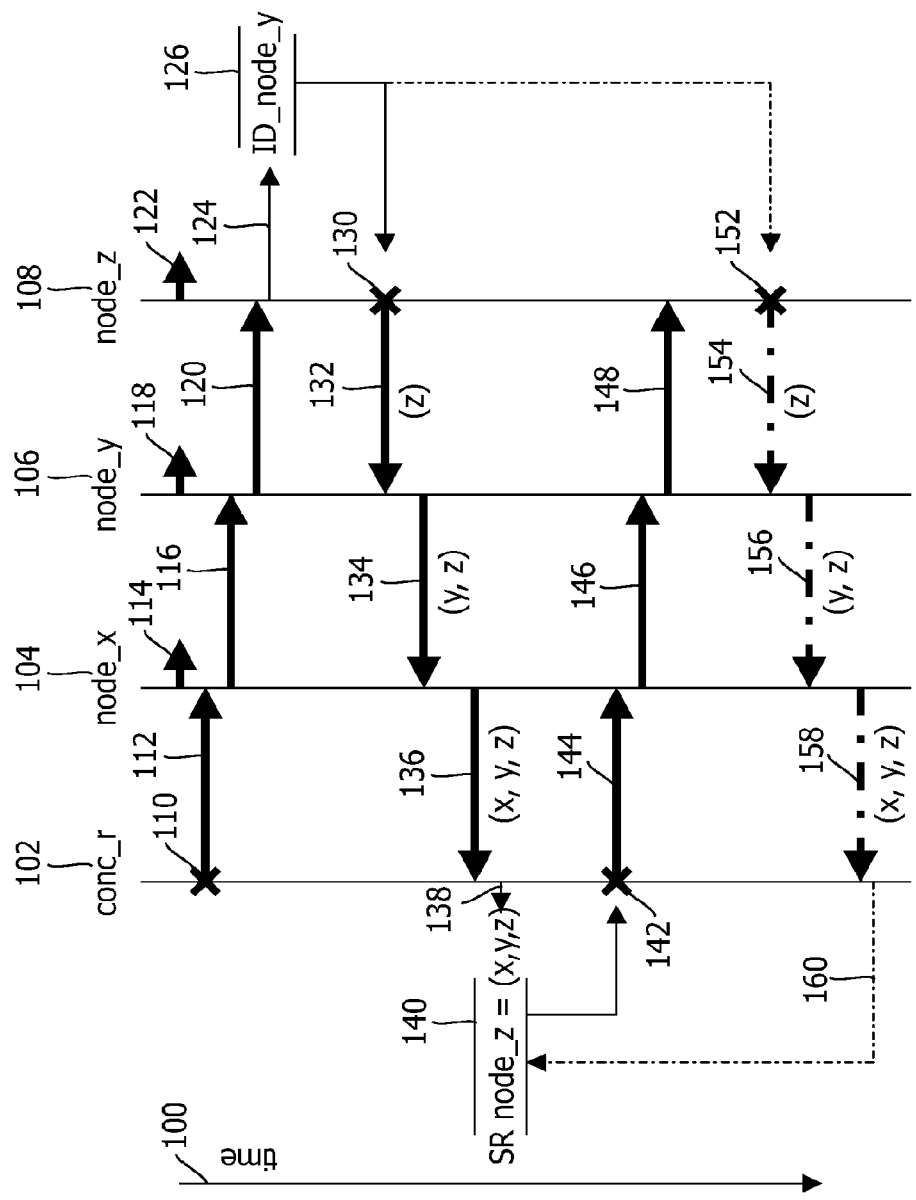
FIG. 1 shows a schematic describing a prior art method for determining routing information for a network of nodes.

FIG. 1 shows a schematic describing a prior art method for determining routing information for a network of nodes. Message transfer is according to the bold arrows, and time increases from top to bottom of the Figure as denoted by the arrow 100. A network entity denoted a concentrator 102 performs the function of aggregating data of a number of nodes in the network. The concentrator 102 sends at 110 a first message 112 to node_x 104. In a ZigBee network, an example of a first message is a suitably modified ZigBee route request frame. On arrival at node_x 104 the node records (not shown in the Figure for clarity) an identifier of the concentrator 102. Node_x 104 also forwards the first message to its neighboring nodes as denoted generally by arrow 114 and to specific neighboring node_y 106 as denoted by first message 116. On arrival at node_y 106 node_y records (again not shown in the Figure for clarity) an identifier of node_x. Node_y 106 further forwards the first message to its neighboring nodes as denoted generally by arrow 118 and in particular to node_z as denoted by arrow 120. On arrival of the first message 120 at node_z 108 node_z records 124 an identifier 126 of node_y and forwards the first message to its neighboring nodes, as denoted generally by arrow 122. At 130 node_z sends a second message 132 to node_y as directed by the stored identifier of node_y. In a ZigBee network, an example of a second message is a ZigBee route record command frame or a suitably modified ZigBee network layer data frame. The second message 132 contains an identifier of node_z, (z), as indicated in the Figure. In turn, node_y having received the second message 132 appends its identifier, y, and forwards the second message 134 to node_x. The forwarded second message 134 contains the identifiers (y, z) of the nodes that the message has already passed. On arrival at node_x of the second message 134, node_x appends its identifier, x, to the second message and forwards this message 136 to the concentrator 102. The forwarded second message 136 contains the identifiers (x, y, z). The concentrator on receiving the forwarded second message 136 stores 138 the node identifiers (x, y, z) as source routing data 140 for node_z 108.

Having acquired the source routing data for node_z the concentrator 102 is able to send at 142 a third message 144 to node_z 108 which comprises the relevant source routing data 140. In a ZigBee network, an example of a third message is a suitably modified ZigBee network layer data frame. The third message 144 is sent from concentrator 102 to node_x 104, node_x being indicated by node identifier, x, of the source routing data within the message. On arrival at node_x 104 the third message is examined by node_x to identify node_y as the next hop in transferring the third message towards node_z. The third message 146 is transferred from node_x 104 to node_y 106. On arrival at node_y 106 the third message 146 is examined and node_z is identified as the next hop for the message from the source route data contained in message 146. The third message 148 is then transferred from node_y 106 to node_z 108. According to some predetermined policy, further second messages are, or are not, sent from node_z to the concentrator 102 as indicated by the chain linked arrows in the Figure. If such messages are to be sent, the process is the same as described earlier for the initial second message and comprises generating the message at 152 and sending the second message via node_y and node_x, as represented by items 154, 156, 158 in the Figure, the process storing 160 source route data at the concentrator 102.

Figure 2A:
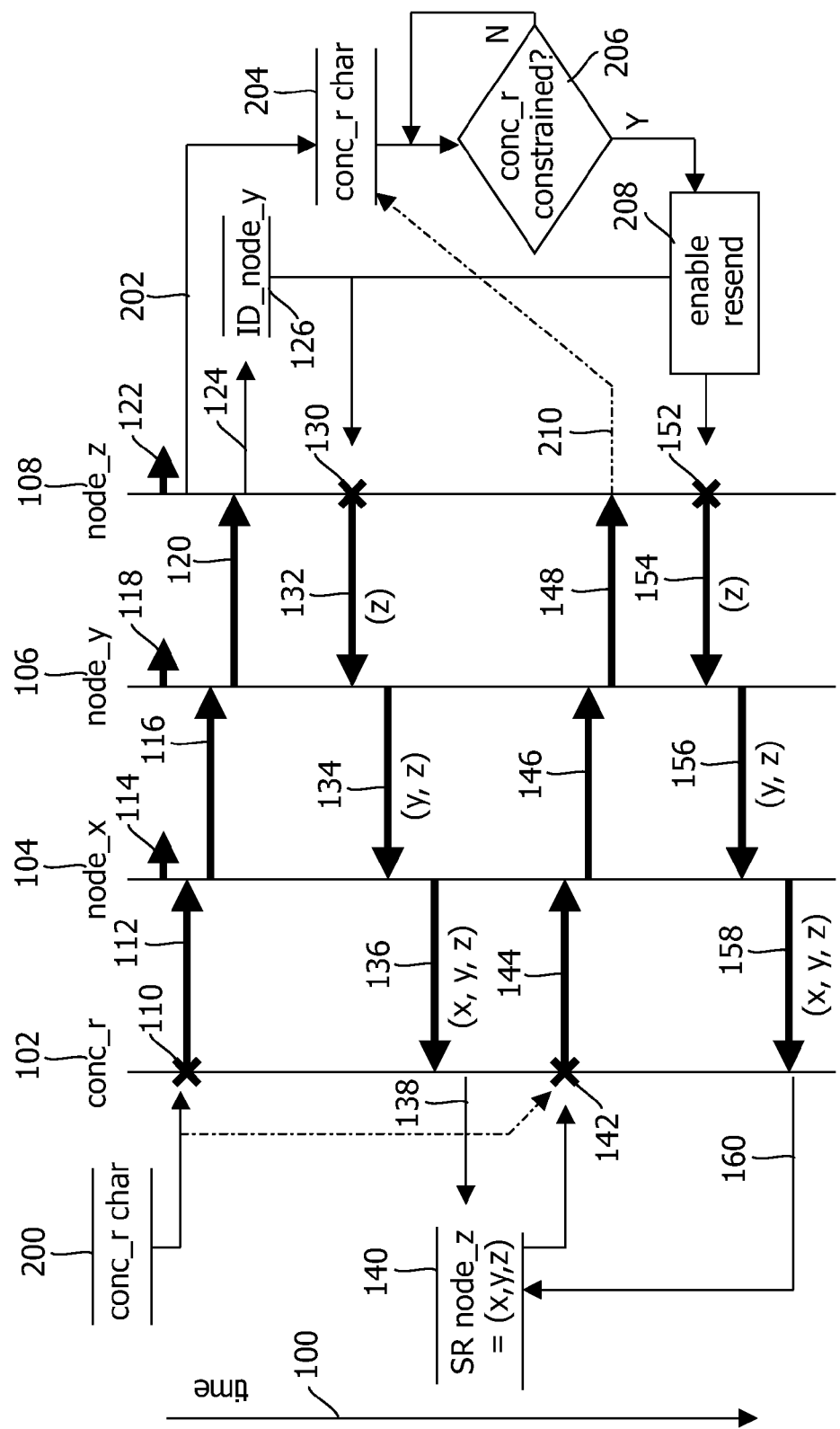
FIGS. 2a and 2b represent schematics of the methods for determining routing information for a network of nodes.

FIG. 2a represents a schematic of a method for determining routing information for a network of nodes. Features common to those of FIG. 1 are denoted using the same reference numerals. One or more relevant characteristics 200 of the concentrator 102 are included in the sent 110 first message. A typical example of a characteristic is an indication of whether the concentrator can store source route data: if so this informs a network node that repeated sending of second messages is unnecessary. Another example of a characteristic is the duration the concentrator can store source route data—this can inform a network node that further sending of second messages is unnecessary before the duration period expires. Other examples may be related to application requirements, for example in the case where the node is mobile relative to the concentrator such that its path (via intermediate nodes) to the concentrator may change over time. It should be noted that concentrator characteristics can change dynamically over time, for example a concentrator's capacity to store source route data can become temporarily, or even permanently, constrained due to demands of an application, or the network activity of other nodes, affecting the concentrator. Similarly, a concentrator can inform nodes of positive effects, for example that it is no longer constrained, perhaps due to lower network activity or even a hardware upgrade. Advantageously, the concentrator can inform the network nodes of characteristics independently of involvement of a user or network administrator (if any).

Referring back to FIG. 2a, the first message 112 is transferred across node_x and node_y, as already described in relation to FIG. 1 previously. On arrival at node_z of first message 120, node_z 108 in addition stores 202 one or more concentrator characteristics 204. The method then proceeds at 130 to send a second message, as already described in relation to FIG. 1 previously. Similarly a third message is generated at 142 and forwarded from the concentrator 102 to node_z 108, as also described in relation to FIG. 1 previously.

In deciding whether further second messages are required to be sent from node_z 108 to the concentrator 102, in the example illustrated in FIG. 2a node_z 108 checks 206 the stored characteristics to determine whether or not the concentrator is constrained, that is whether or not it has limited capacity to store source route data for nodes. If it is constrained, then further sending of second messages is enabled 208. Consequently, a further second message is sent 152 from node_z 108 to concentrator 102, as already described in relation to FIG. 1 previously. Alternative, or further, checks according to the types of concentrator characteristics are possible as recognized by the skilled person, for instance based on the example characteristics discussed briefly above.

As an option, and as shown by dashed lines, the third message 148 received by node_z 108 can optionally update 210 the concentrator characteristics held by a particular node, such as node_z 108 as shown in the Figure. This is useful to enable exceptions for a selected node or nodes (to have a different basis of communication with the concentrator with respect to other nodes). For example where node_z generally sends many messages regularly to the concentrator, characteristics can be sent by a third message to permit suspension in sending second messages, even though the concentrator has previously advised nodes that it is ostensibly constrained (not normally able to store source route data). For this node therefore the concentrator would in fact cache (store) the source route data. In such a way, network bandwidth is conserved for nodes which communicate frequently with a constrained concentrator. Other examples of exceptions can be identified. As an example, in order to ensure robust communication with a particular node, that node might be advised to send further second messages even though the concentrator has the capacity to store source route data.

Figure 2B:
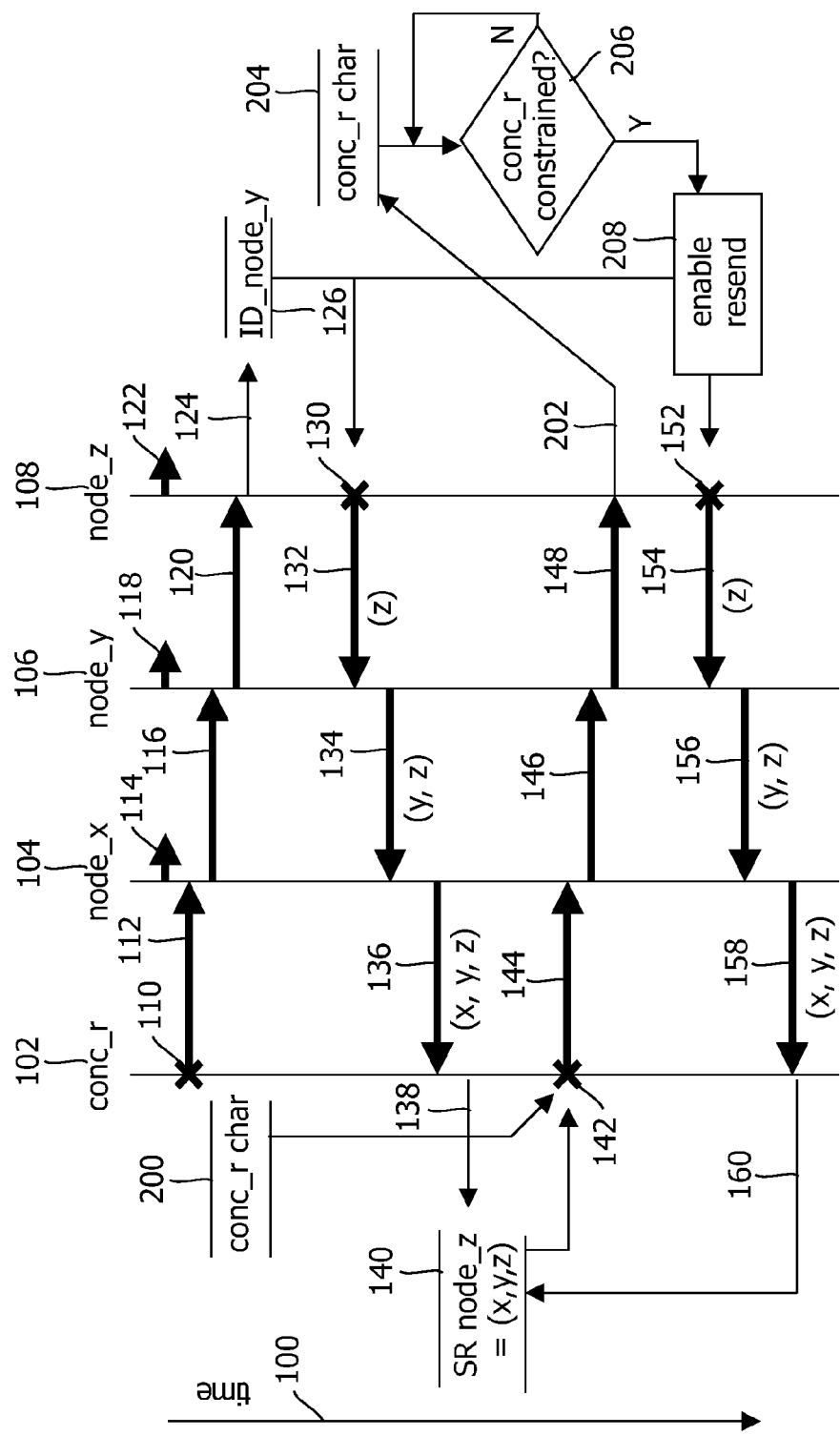

FIG. 2b represents a schematic of an alternative method for determining routing information for a network of nodes. Features common to those of FIGS. 1 and 2a are denoted using the same reference numerals. Unlike the method depicted in FIG. 2a, in the method of FIG. 2b one or more relevant characteristics 200 of the concentrator 102 are included in the sent 142 third message, none having initially been sent 110 in the first message 112. The third message 144 is transferred across node_x and node_y, as already described in relation to FIGS. 1 and 2a previously. On arrival at node_z of third message 148, node_z 108 in addition stores 202 one or more concentrator characteristics 204, replacing one or more default characteristics (not shown in FIG. 2b) already stored for concentrator 102.

In deciding whether further second messages are required to be sent from node_z 108 to the concentrator 102, node_z 108 checks 206 the stored characteristics to determine whether or not the concentrator is constrained. In the case where it is constrained, then further sending of second messages is enabled 208. Compared to the method of FIG. 2a, the method illustrated in FIG. 2b provides an alternative mechanism to regulate network bandwidth usage whilst avoiding use of first messages to send concentrator characteristic(s).

Clearly, a combination of methods illustrated by FIGS. 2a and 2b is also possible, for example where a subset of concentrator characteristics is sent using the first message, which subset is subsequently augmented or updated using the third message.

Figure 3:
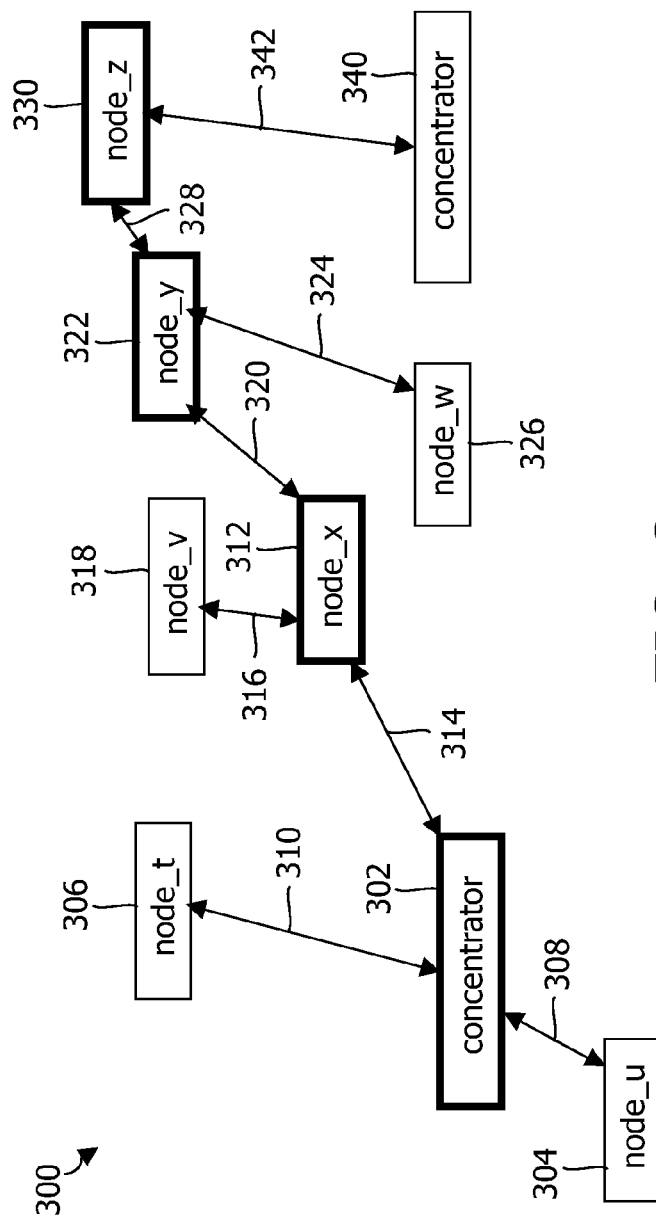
FIG. 3 shows a network comprising two concentrators and a variety of nodes.

FIG. 3 shows generally at 300 a network comprising two concentrators and a variety of nodes. Concentrator 302 communicates with node_u 304 and node_t 306 using wireless links 308 and 310 respectively. Concentrator 302 also communicates wirelessly 314 with node_x 312. In turn, node_x 312 communicates with node_v 318 via wireless link 316 and with node_y 322 via wireless link 320. In turn, node_y 322 communicates with node_w 326 via wireless link 324 and with node_z 330 via wireless link 328. Node_z 330 also communicates with concentrator 340 using wireless link 342. The highlighted network entities of concentrator 302, node_x 312, node_y 322 and node_z 330 represent the concentrator and nodes as discussed in relation to FIGS. 1, 2a and 2b above. Of particular note is that node_z maintains (not shown in the Figure) stored characteristics for each concentrator 302, 340 with which it communicates and adjusts the sending of further second messages to each concentrator in dependence on the characteristic(s) it currently holds for that concentrator. The skilled person will recognize that, in general, nodes operating in a network comprising more than one concentrator will need also to store an associated concentrator identifier with the node identifier recorded when the first message (e.g. message 112, 116, 120, of FIGS. 1, 2a and 2b) traverses the network. The method is applicable to a range of wired and wireless networks, including wide area networks such as the Internet, and wireless IrDA, Wi-Fi or Bluetooth networks, etc. It is particularly suited to situations where cost is important, such as ZigBee network concentrators and nodes.

Figure 4:
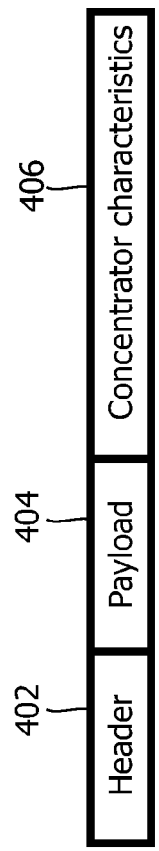
FIG. 4 shows an example first message structure comprising header, payload and concentrator characteristics.

FIG. 4 shows an example first message structure comprising header 402, payload 404 and a field for concentrator characteristics 406. Clearly any suitable packet construction can be adopted to implement the present invention, as is readily identifiable to the skilled person. In a preferred example a ZigBee route request frame is suitably modified to incorporate a field for concentrator characteristics. As an option a modified ZigBee network layer data frame is suitably modified to incorporate a field for concentrator characteristics when signaling such characteristics to a particular node. The syntax of the concentrator characteristics field can be determined according to the requirements of the application or protocol and the range of identified concentrator characteristics, and is readily identifiable by the skilled person.

The foregoing method and implementations are presented by way of examples only and represent a selection of a range of methods and implementations that can readily be identified by a person skilled in the art to exploit the advantages of the present invention.

In the description above and with reference to the Figures there are provided methods and systems in which an invitation message 112, 116, 120 is sent from a concentrator 102 to nodes in a network. Each node records 124 an identifier 126 of the node or concentrator from which it received the message and forwards 122 the message to its neighbors. A node 108 then sends a trace message 132, 134, 136 to the concentrator 102 via intermediate nodes 106, 104 traversed by the invitation message in reaching the node and appends thereto the identifiers of the intermediate nodes. The concentrator then uses source routing to send a subsequent message 144, 146, 148 to the node 108 using the identifiers included in the trace message. The invitation message and/or the subsequent message includes characteristic(s) 200 of the concentrator one or more of which are then stored by nodes, including node 108. The characteristic(s) are used in deciding 206, 208 to send further trace messages, thereby regulating use of network bandwidth.

The invention claimed is:

1. A method for determining routing information for a network of nodes, comprising:
    sending a first message from a concentrator to the nodes in the network, wherein each node records an identifier of the node or concentrator from which the node receives the first message and then forwards the first message to neighboring nodes, wherein the first message includes at least one characteristic of the concentrator, said at least one characteristic including an indicator denoting the amount of storage capacity available for storing identifiers;
    sending a second message identifying a first node to the concentrator, wherein the second message traverses any intermediate nodes traversed by the first message to reach the first node and has appended the identifier of each such intermediate node;
    determining a route for a third message from the concentrator to the first node according to the identifiers included in the second message;
    recording said at least one characteristic at the first node;
    determining whether the concentrator is constrained based on said at least one characteristic; and
    sending an additional message from the first node to the concentrator if said at least one characteristic indicates that the concentrator's storage capacity for identifiers is constrained.

2. A method as claimed in claim 1, wherein the third message comprises at least one characteristic of the concentrator.

3. A method as claimed in claim 1, wherein the first message is a modified ZigBee route request frame.

4. A method as claimed in claim 1, wherein the second message is a ZigBee route record command frame.

5. A method as claimed in claim 1, wherein the second message is a modified ZigBee network layer data frame.

6. A method as claimed in claim 1, wherein the third message is a modified ZigBee network layer data frame.

7. A system for determining routing information for a network of nodes, the system comprising:
    a concentrator operable to send a first message to nodes in the network;
    a first node operable to:
    record an identifier of the node or concentrator from which the first node receives the first message;
    forward the first message to neighboring nodes;
    send a second message identifying the first node to the concentrator, wherein the second message traverses any intermediate nodes traversed by the first message to reach the first node and has appended the identifier of each such intermediate node; and
    the concentrator being operable to:
    receive the second message; and
    determine a route for a third message from the concentrator to the first node according to the identifiers included in the second message; wherein
    the concentrator is further operable to include at least one characteristic of the concentrator in the first message, said at least one characteristic including an indicator denoting the amount of storage capacity available for storing identifiers, and
    the first node is further operable to:
    record said at least one characteristic at the first node; and,
    send an additional message from the first node to the concentrator if said at least one characteristic indicates that the concentrator's storage capacity for identifiers is constrained.

8. A system as claimed in claim 7, wherein the third message comprises at least one characteristic of the concentrator.

9. A system as claimed in claim 7, wherein the first message is a modified ZigBee route request frame.

10. A system as claimed in claim 7, wherein the second message is a ZigBee route record command frame.

11. A system as claimed in claim 7, wherein the second message is a modified ZigBee network layer data frame.

12. A system as claimed in claim 7, wherein the third message is a modified ZigBee network layer data frame.

* * * * *